Figure 3:
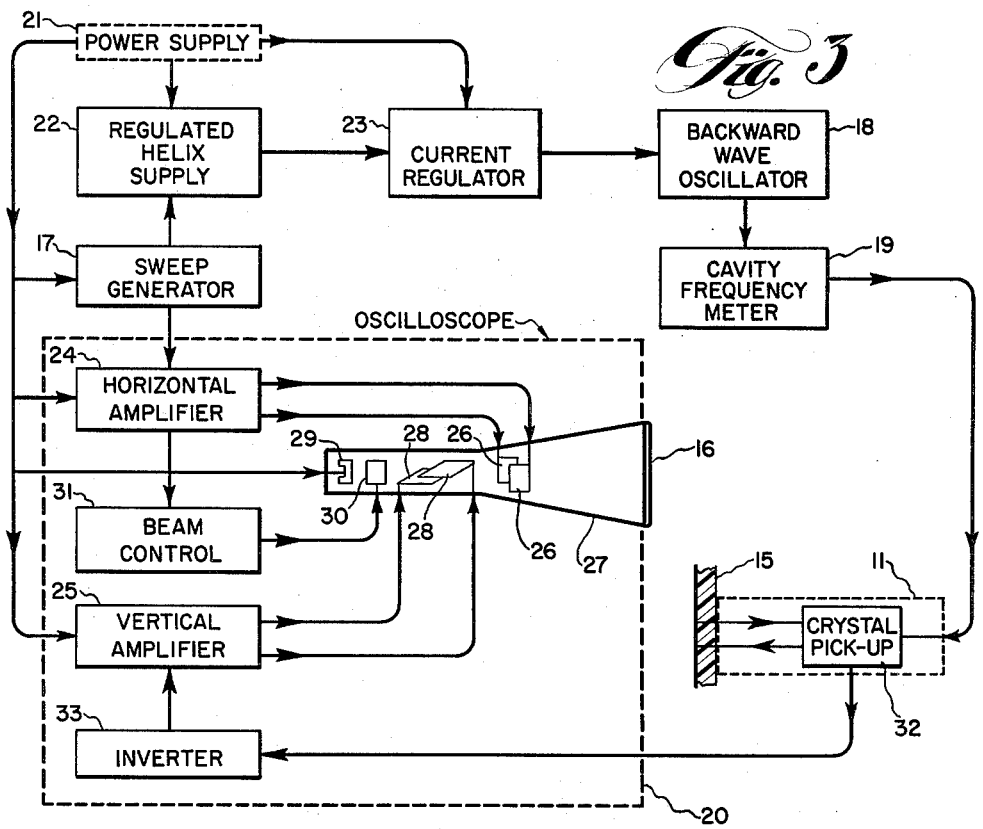

Aug. 27, 1963
J. D. LEONARD ETAL
3,102,232
MICROWAVE ELECTRICAL THICKNESS COMPARATOR
UTILIZING A WAVEGUIDE PROBE
Filed June 17, 1960
3 Sheets-Sheet 1
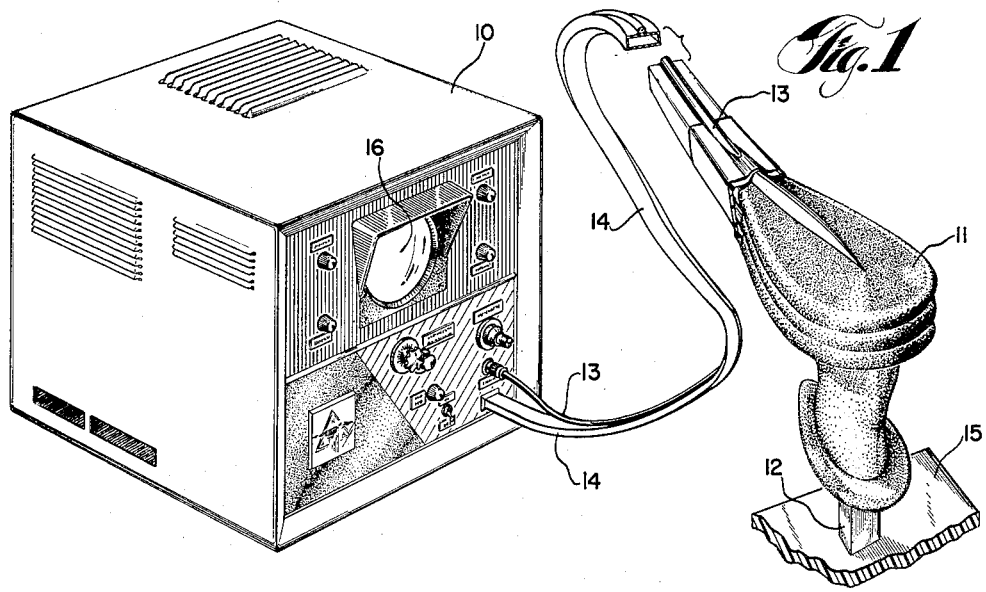
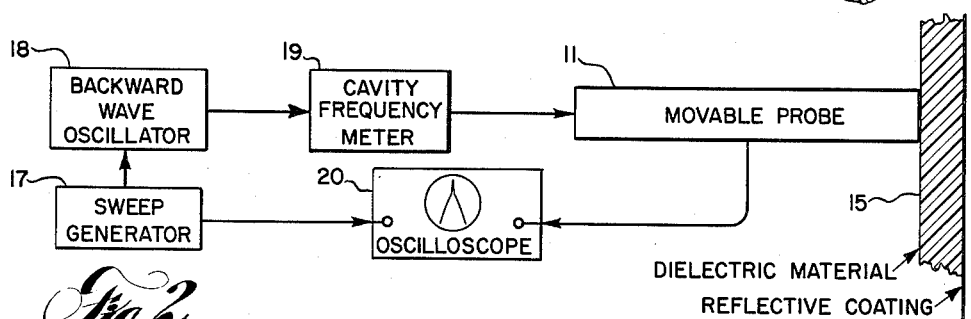
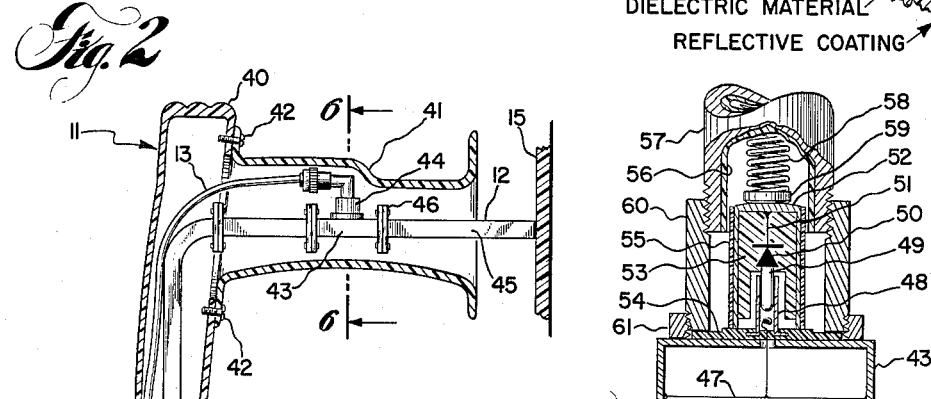
INVENTORS
JAMES D. LEONARD
GEORGE T. STROPKI
BY 
ATTORNEY

INVENTORS
JAMES D. LEONARD
GEORGE T. STROPKI

ATTORNEY

INVENTORS
JAMES D. LEONARD
GEORGE T. STROPKI ized Patent Office
3,102,232
Patented Aug. 27, 1963

3,102,232
MICROWAVE ELECTRICAL THICKNESS COMPARATOR UTILIZING A WAVEGUIDE PROBE
James D. Leonard, Columbus, and George T. Stropki, Gahanna, Ohio, assignors to North American Aviation, Inc.
Filed June 17, 1960, Ser. No. 36,790
7 Claims. (Cl. 324—58.5)

This invention relates to the comparison of microwave electrical thicknesses of non-conducting workpieces or materials, and concerns an equipment arrangement for obtaining improved indications and measurements of microwave electrical thickness differences.

Considerable difficulty has heretofore been experienced in connection with obtaining consistently accurate indications of uniformity or change in total microwave electrical thickness in non-conducting materials. Because of problems relating to homogeneous composition and problems relating to non-conformity between density and dielectric constant characteristics, especially as associated with laminated, high accuracy radome constructions and comparable materials, the use of ultrasonic techniques and equipments has proved almost entirely unacceptable for microwave electrical thickness uniformity determinations. Known radio frequency energy techniques and equipments have been established as being deficient in several respects. For instance, the use of microwave equipment arrangements wherein electro-magnetic energy is combined or divided at magic-tee components requires careful control of amplitude balancing. The use of techniques wherein radio frequency energy must be passed through and measured at an interior or opposite side of the non-conducting workpiece has posed substantial problems with respect to techniques of operation.

Such difficulties are overcome through the use in this invention of an equipment arrangement wherein the comparison presentation is developed from combined radiated and reflected microwave signals having a resultant form. The resultant form of microwave signal is characterized as being uniformly frequency-swept over a given frequency bandwidth and with constant amplitude but without significant output amplitude at a pre-selected frequency value within the range of the swept frequency band.

Accordingly, it is an important object of our invention to provide an equipment arrangement for comparing microwave electrical thicknesses in a manner whereby comparision information which is significantly improved as to quality and consistency of accuracy is developed for visual presentation and consideration.

Another object of this invention is to provide an equipment arrangement for comparing microwave electrical thicknesses which overcomes the inherent comparison difficulties associated with use of ultrasonic (acoustic) equipments for establishing comparisons which are only generally similar.

Another object of this invention is to provide a microwave equipment arrangement for indicating non-uniformity in dielectric thicknesses in a manner which does not impose undesirable limitations on use of the equipment in applications involving the evaluation of highly contoured workpieces such as radomes and the like.

A still further object of this invention is to provide an equipment arrangement for comparing microwave electrical thicknesses which is comparatively simple and economical to fabricate, which may be conveniently maintained in operating conditions, and which has performance reliability.

Other objects and advantages of this invention will become apparent during consideration of the description and drawings.

Figure 7:
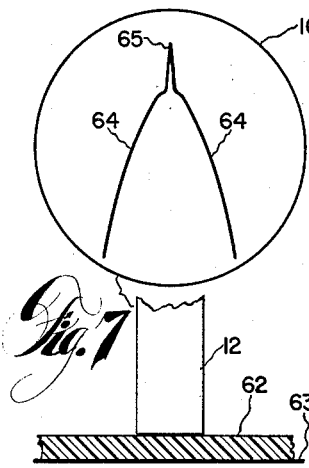
Figure 8:
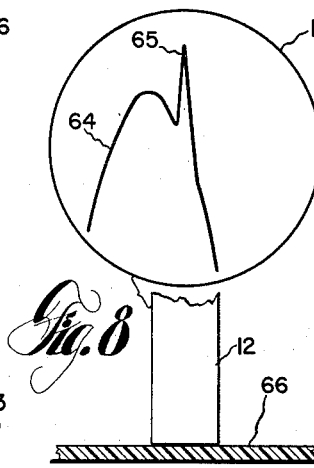
Figure 9:
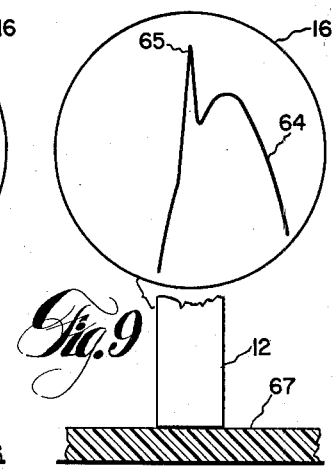
Figure 4:
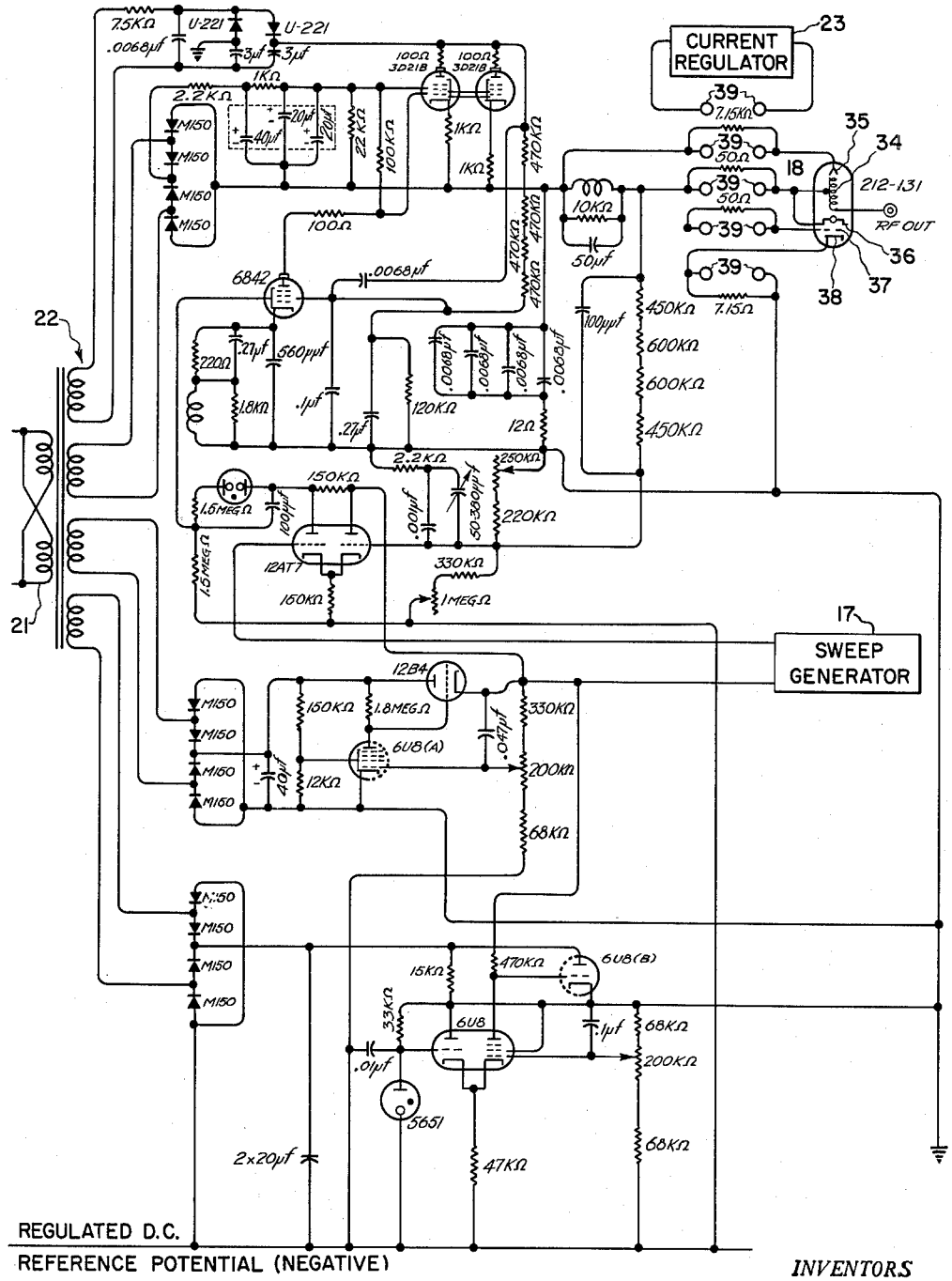

In the drawings:
FIG. 1 illustrates an equipment arrangement which is utilized in connection with this invention;
FIG. 2 is a schematic block diagram of the essential components of the microwave electrical thickness comparator described herein;
FIG. 3 is a schematic block diagram that provides additional details regarding our invention;
FIG. 4 illustrates details of a suitable circuit for developing the regulated helix supply referenced in FIG. 3;
FIG. 5 is a section taken through the movable probe component employed in our invention;
FIG. 6 is a sectional view taken at line 6—6 of FIG. 5; and
FIGS. 7 through 9 illustrate typical visual presentations which are developed during the use of our invention to compare microwave electrical thicknesses.

The microwave electrical thickness comparator of our invention may be arranged into the equipment combination illustrated in FIG. 1. Such equipment consists generally of console unit 10 and movable probe 11. Probe 11 includes a rigid waveguide element 12 and is connected to console 10 through coaxial line means 13 and through flexible waveguide means 14. The lower section of console 10 contains the necessary circuit components for developing a microwave output signal which is frequency-swept over a definite frequency bandwidth, which is characterized as being without significant output amplitude at a selected frequency value within the range of the swept bandwidth, and which is fed to flexible waveguide means 14. The upper section of console unit 10 contains a conventional oscilloscope. The output signal fed into flexible waveguide 14 is transmitted to probe 11 for radiation from the end of waveguide element 12 into the workpiece 15 and for reflection into waveguide element 12 from a reflective surface located at the underside of such workpiece. The resultant signal comprised of such radiated and reflected signals is continuously monitored and detected within probe 11 and is transmitted to the oscilloscope section of console 10 through coaxial line means 13. The resultant signal is used to develop a presentation on oscilloscope screen 16.

The circuit components housed in the lower section of console unit 10 are referenced in FIG. 2 and consist essentially of sweep generator means 17, backward wave oscillator means 18, and cavity frequency meter means 19. Oscilloscope 20 is positioned within the upper section of console unit 10. Sweep generator 17 essentially develops a saw tooth output signal to provide the sweep for the horizontal plates of oscilloscope 20 and to coordinate the sweep of frequencies by backward wave oscillator means 18 with the horizontal plate sweep of the oscilloscope. Backward wave oscillator 18 develops an output signal of relatively constant amplitude which is frequency swept over a given bandwidth. For instance, a suitable constant amplitude output signal may be developed therein for comparing Ku-band radome microwave electrical thicknesses by providing a frequency sweep extending over the frequency band of from approximately 14,850 megacycles to approximately 16,850 megacycles coordinated with the operation of saw tooth sweep generator 17 at a sweep frequency of approximately 200 cycles per second. Cavity frequency meter 19 absorbs microwave energy of a particular wavelength (frequency). Preferably, cavity frequency meter 19 is of a conventional variable type, has a high-Q cavity characteristic, and functions to absorb the energy portion developed by backward wave oscillator 18 at one frequency near the mid-point of the swept frequency band. However, energy may instead be absorbed at a frequency in either end region of the swept frequency band. Thus, the output signal developed for transmission in waveguide 14 to probe 11 is characterized as being of constant amplitude and repeatedly swept over a selected frequency bandwidth save for being substantially reduced in amplitude at a very narrow, particular in-range frequency band. The open end of waveguide element 12 in probe 11 is butted against workpiece 15 in a contacting and generally perpendicular relation. The resultant signal detected within waveguide element 12 will be entirely lost in a presentation sense if the contacting relation is not maintained or if substantial departures from the perpendicular relation are permitted to exist. As shown in FIG. 2, the opposite or underside of workpiece 15 is provided with a reflective coating which will be hereinafter described.

Additional details regarding this invention are illustrated in FIG. 3. A conventional alternating current power supply 21 may be used to develop the energy requirements for operating the basic equipment arrangement. It is important that the power supplied to helix component 34 (FIG. 4) of backward wave oscillator means 18 be suitably regulated. For this reason we provide a regulated helix supply 22, which develops potential stability, and a current regulator circuit 23. Regulator circuit 23 may be of a multi-position type to develop selectivity and versatility in the equipment arrangement. Details regarding a preferred regulated helix supply 22 are given in FIG. 4. Sweep generator means 17 is powered by supply 21 and its saw tooth output signal is simultaneously directed to horizontal amplifier means 24 and to regulated helix supply 22 for the hereinbefore-described coordination purposes. Horizontal amplifier 24 and vertical amplifier 25 are a part of oscilloscope 20. Horizontal amplifier 24 is connected to power supply 21 and is also connected to the horizontal plates 26 of cathode ray tube 27 in a conventional manner. Vertical amplifier 25 is similarly connected to power supply 21 and to the vertical plates designated 28. Cathode element 29 is utilized in developing the basic electron beam in tube 27; its energy source is power supply 21. The oscilloscope electron beam is regulated as to intensity, focus, and the like by the schematically designated conventional grid-anode means 30. Such means is governed by beam control 31. Movable probe 11, which receives the output signal of backward wave oscillator 18 (as modified by cavity frequency meter 19), includes the waveguide section 12 having crystal pickup 32 therein for continuously monitoring and detecting a resultant signal. The oscilloscope is also provided, for reasons to be developed later, with an inverter circuit 33. Referring to FIG. 3, the saw tooth sweep signal established by sweep generator means 17 is amplified by horizontal amplifier 24 to control the deflection of horizontal plates 26; the coordinated resultant signal detected by crystal pickup 32 is inverted by circuit 33 and amplified by vertical amplifier 25 to control the deflection of vertical plates 28. Because the detected signal may be highly attenuated, substantial amplification at amplifier 25 may be required if oscilloscope 20 has a low-sensitivity characteristic.

Because the necessity of providing a properly stabilized power supply to the helix component 34 of backward wave oscillator 18 can be critical, we illustrate a suitable circuit for such purpose in FIG. 4. The circuit diagram provided therein shows the connected relation of sweep generator 17, backward wave oscillator 18, a portion of power supply 21, and current regulator circuit 23 to the regulated helix supply 22. Backward wave oscillator 18 is illustrated in further detail with a showing of its helix (34), collector (35), beam shaper (36), control grid (37), and cathode (38) components. Numerous paired terminals 39 are illustrated in FIG. 4 to show a design technique whereby a current regulator 33 of the multi-position type can be switched to various circuit portions to thereby combine with different of the components of backward wave oscillator 18 to vary the width and limits of the frequency band being swept for the basic output signal.

FIGS. 5 and 6 provide section information with respect to portions of the equipment illustrated in FIG. 1. Probe 11, in addition to including rigid waveguide element 12, has the nonconducting housing portions 40 and 41 which are connected by fastener means 42. Waveguide element 12 includes a section 43 for mounting pickup assembly 44 and includes the separate end section designated 45. End section 45 is detachably connected to section 43 at flange means 46 by any suitable fastener device. It should be noted that the crystal pickup 32 of FIG. 4 is contained within assembly 44 and is located a predetermined distance from the open end of waveguide section 45. Such distance is generally a multiple (odd or even) half wavelength, each half wavelength essentially being determined by the absorption frequency of cavity frequency meter means 19 within the frequency band swept by backward wave oscillator 18. To develop versatility of application for the components disclosed in FIG. 1, additional waveguide element end sections 45 of other lengths are provided for use with different workpiece constructions when it is desired to sweep different frequency bands for comparison purposes. Because assembly 44 should be precisely located at the pre-selected distance from the open end of section 45, it is more convenient to change waveguide end sections than to reposition assembly 44 within waveguide section 43.

Details of assembly 44 are shown in FIG. 6. The heretofore referenced crystal pickup 32 essentially consists of: T-bar probe 47 which is sensitive to microwave signal amplitudes, socket element 48 connected to probe 47, pin terminal 49, crystal element 50, lead member 51, and contact case 52. Crystal element 50 is embedded in non-conducting medium 53. Insulator components 54 through 56 are fabricated of non-conducting materials. Connector elements 57 through 59 are utilized to establish a proper connection between coaxial line means 13 and pickup assembly 44. Sleeve 60 and ring 61 are utilized to secure assembly 44 to waveguide section 43.

Workpieces which are to be inspected for uniformity of microwave electrical thickness using the equipment arrangement of this invention must first be prepared to include a reflective coating at an interior or under-surface thereof. See FIG. 2. Such coating may be achieved by compounding, applying, and properly curing a material consisting of a metallic pigment combined with a strippable carrier resin. Alternatively, the to-be-examined workpiece may be covered at the required interior or underside location with an adhering but easily removed metallic tape. With respect to the workpiece surface which remains uncoated, it is required only that the open end of waveguide 12 be moved freely thereover in normal contacting relation.

FIGS. 7 through 9 illustrate oscilloscope screen displays which are typically developed during the use of this invention. The presentation of FIG. 7 is preferably developed in connection with the standard or reference microwave electrical thickness. Waveguide element 12 is placed with its open end against standard specimen 62. Reflective metallic coating 63 is provided at the underside thereof. The various manual adjustment components at the face of console unit 10 are manipulated to obtain the illustrated oscilloscope screen presentation. The frequency limits of the frequency band being swept by backward wave oscillator 18 are selected by switching current regulator 33 to a proper position at the output of regulator helix supply 22 to thereby establish the inverted curve portion 64 of the display. The inverted pip portion 65 of the presentation on screen 16 is developed by adjusting cavity frequency meter 19 for the desired narrow frequency band of energy absorption. Pip portion 65 is imposed on curve portion 64 with the peak of curve portion 64 aligned horizontally therewith. Oscilloscope adjustment of the screen presentation may be accomplished in any conventional manner.

Waveguide element 12 is next similarly placed upon workpiece 66, which may be a part of a radome, to compare microwave electrical thicknesses. Workpiece portion 66 is exaggerated in FIG. 8 to show a marked reduction in physical thickness and a likely reduction in microwave electrical thickness. However, workpiece portion 66 may, in fact, be physically as thick or thicker than reference specimen 62 and yet have a microwave electrical thickness which is significantly less in value. The degree of horizontal displacement of the peak of curve portion 64 from pip portion 65 is a measure of the difference between microwave electrical thicknesses of the specimen and the workpiece portion.

FIG. 9 illustrates a screen presentation wherein the workpiece portion 67 (illustrated in an exaggerated manner) has a greater microwave electrical thickness. Workpiece portion 67 may, in fact, be physically thinner than specimen 62 yet have a greater microwave electrical thickness. The resulting presentation shows the peak of curve portion 64 displaced horizontally a distance to the right of pip portion 65. Again, the degree of displacement is a measure of differences, in the examined workpiece, of dielectric constant and physical thickness.

Accordingly, the invention described herein provides novel equipment arrangement to develop improved information regarding microwave electrical thickness differences. Considerable difficulty has heretofore been experienced in developing a screen presentation which is adequate for use in visually detecting significant shifts in total microwave electrical thickness. Such shifts may contribute substantially to poor radome fabrication and performance. Corresponding problems can now be resolved by use of this invention and the display presentation based on frequency-swept microwave energy having an extracted frequency zone. This invention has also greatly simplified equipment requirements as to freedom from complexity and ease of fabrication, inspection, and maintenance. Unexpected results are also realized with respect to the accuracy and consistency of the information used as the basis for developing the oscilloscope screen presentation. This invention also substantially reduces the effort which would otherwise be required to compare microwave electrical thicknesses in typical highly contoured microwave-transparent workpieces or comparable dielectric materials.

Other advantages are also attributed to the invention described herein. For instance, the equipment of FIG. 1 may also be used to compare loss characteristic changes (energy absorbing power) in homogeneous workpieces of uniform microwave electrical thickness. In this respect the detected change in loss characteristic is measured by the vertical displacement of the peak of curve portion 64 relative to the tip of pip portion 65 as waveguide element 12 is moved over the surface of the workpiece in contacting relation thereto.

It is to be understood that the form of the invention herewith shown and described is to be taken as a preferred embodiment of the same, but that various changes in the shape, size, and arrangement of parts may be resorted to without departing from the spirit of the invention or the scope of the following claims.

We claim:

1. In combination with a laminate-like workpiece having a microwave-transparent portion and a microwave-reflecting portion immediately adjacent said microwave-transparent portion, comparator means for indicating the relative microwave electrical thickness of said workpiece microwave-transparent portion, said comparator means comprising: presentation means activated by a controlled electron beam, and electron beam control means coupled to said presentation means and having; first means developing a constant amplitude microwave output signal which is frequency-swept over a selected frequency band, second means extracting a portion of the output signal developed by said first means at an operating frequency in said selected frequency band, and probe means contacting said workpiece microwave-transparent portion and radiating the output signal developed by said first and second means toward said workpiece microwave-reflecting portion, said probe means containing a microwave signal detecting means which is located a distance from said workpiece microwave-reflecting portion that is a whole multiple of a half-wavelength of said second means operating frequency, which continuously receives the output signal developed by said first and second means, which continuously receives portions of the developed output signal that are reflected by said workpiece microwave-reflection portion, and which is coupled to said presentation means in resultant signal amplitude-transmitting relation.

2. The combination recited in claim 1, wherein the microwave output signal developed by said first means is frequency-swept over a band having definite frequency limits, said second means operating frequency being located substantially mid-way between said frequency limits.

3. The combination defined by claim 1, wherein said probe means includes a rigid waveguide element which has an end surface and which contains said detecting means, said detecting means being positioned a distance from said end surface which is a multiple of a half wavelength of said second means operating frequency.

4. A microwave electrical thickness comparator having, in combination: oscilloscope screen means, oscillator means developing a frequency-swept microwave output signal of constant amplitude, cavity means absorbing a selected portion of said oscillator means output signal, contact probe means having an open end and radiating the unabsorbed portion of said oscillator means output signal, and microwave signal pickup means located in said probe means at a position which detects a condition caused by microwave energy radiated from and reflected into said probe means, said pickup means being connected to said oscilloscope screen means in display relation.

5. The comparator defined in claim 4, wherein said cavity means absorbs the selected portion of said oscillator means output signal at a particular narrow frequency band, said particular narrow frequency band being centered in the frequency band of said oscillator means output signal.

6. The comparator defined in claim 4, wherein said probe means includes a waveguide section contact surface at the signal-radiating end thereof, said pickup means being positioned a distance from said waveguide section contact surface which is a multiple of half wavelengths based upon the particular absorption frequency of said cavity means.

7. A microwave electrical thickness comparator consisting of: oscilloscope presentation means, backward wave oscillator means developing a frequency-swept output signal, cavity frequency meter means absorbing a portion of said backward wave oscillator means output signal, and waveguide probe means operatively connected to said cavity means to receive and radiate the unabsorbed portion of said backward wave oscillator means output signal, said waveguide probe means containing a microwave-sensitive crystal means which is operatively connected to said oscilloscope presentation means and which detects a condition caused by microwave energy radiated from and reflected into said probe means.

References Cited in the file of this patent

UNITED STATES PATENTS

| | | |
|---|---|---|
| 2,489,092 | Larrick | Nov. 22, 1949 |
| 2,630,472 | McArthur | Mar. 3, 1953 |
| 2,952,296 | Kofoid | Sept. 13, 1960 |
| 2,999,982 | Broussaud | Sept. 12, 1961 |

(Other references on following page)

OTHER REFERENCES

Riblet: A Swept-Frequency 3-Centimeter Impedance Indicator, Proc. of I.R.E., December 1948; pp. 1493–1499.

Vogelman: Precision Measurement of Waveguide Attenuation, Electronics, December 1953; pp. 196–199.

Nowogrodzki: Measuring Cavity Resonator Q, Tele-Tech and Electronic Industries, June 1954; p. 97.

Radome Thickness Gage, article in Electronics June 20, 1958, pp. 70–72.

Yarvi et al.: Experimental Procedure for the Determination of Cavity Parameters, The Review of Scientific Instruments, vol. 30, No. 8, August 1959; pp. 684–687.